US008843312B2

(12) United States Patent
Kim et al.

(10) Patent No.: US 8,843,312 B2
(45) Date of Patent: Sep. 23, 2014

(54) ROUTING DRIVERS TO TRAILERS EFFECTIVELY

(75) Inventors: Frederick Duke Kim, Carlsbad, CA (US); Thomas Francis Doyle, San Diego, CA (US); Michael Joseph Contour, Del Mar, CA (US)

(73) Assignee: Omnitracs, LLC, San Diego, CA (US)

( * ) Notice: Subject to any disclaimer, the term of this patent is extended or adjusted under 35 U.S.C. 154(b) by 705 days.

(21) Appl. No.: 11/858,876

(22) Filed: Sep. 20, 2007

(65) Prior Publication Data

US 2009/0082962 A1 Mar. 26, 2009

(51) Int. Cl.
*G01C 21/34* (2006.01)
*G06Q 10/04* (2012.01)
*G08G 1/00* (2006.01)
*G08G 1/0968* (2006.01)
*G01C 21/36* (2006.01)

(52) U.S. Cl.
CPC .......... *G01C 21/3407* (2013.01); *G06Q 10/047* (2013.01); *G08G 1/20* (2013.01); *G08G 1/096827* (2013.01); *G01C 21/362* (2013.01)
USPC ..................................... 701/469; 340/539.13

(58) Field of Classification Search
USPC .............. 701/213, 469; 340/359.13
See application file for complete search history.

(56) References Cited

U.S. PATENT DOCUMENTS

| | | | |
|---|---|---|---|
| 4,688,244 A | 8/1987 | Hannon et al. | |
| 4,750,197 A | 6/1988 | Denekamp et al. | |
| 5,532,690 A * | 7/1996 | Hertel | 340/989 |
| 5,539,810 A | 7/1996 | Kennedy et al. | |
| 5,544,225 A | 8/1996 | Kennedy et al. | |
| 5,686,888 A * | 11/1997 | Welles et al. | 340/539.13 |
| 5,775,712 A * | 7/1998 | Link et al. | 280/422 |
| 5,835,377 A | 11/1998 | Bush | |
| 5,917,433 A * | 6/1999 | Keillor et al. | 340/989 |
| 5,999,091 A * | 12/1999 | Wortham | 340/431 |
| 6,265,988 B1 | 7/2001 | Lemense et al. | |
| 6,577,921 B1 | 6/2003 | Carson | |
| 6,606,557 B2 * | 8/2003 | Kotzin | 701/209 |
| 6,665,613 B2 * | 12/2003 | Duvall | 701/485 |
| 6,687,609 B2 * | 2/2004 | Hsiao et al. | 701/517 |
| 6,721,652 B1 * | 4/2004 | Sanqunetti | 701/468 |
| 6,870,473 B2 * | 3/2005 | Brown, Jr. | 340/463 |

(Continued)

FOREIGN PATENT DOCUMENTS

| | | |
|---|---|---|
| DE | 19704210 | 8/1998 |
| WO | WO2007097766 | 8/2007 |

OTHER PUBLICATIONS

International Search Report and Written Opinion—PCT/US2008/076511, International Search Authority—European Patent Office—Mar. 19, 2009.
Office Action dated Jan. 25, 2011. U.S. Appl. No. 11/858,876.

(Continued)

*Primary Examiner* — Tuan C. To
(74) *Attorney, Agent, or Firm* — Arent Fox LLP

(57) ABSTRACT

A method and apparatus for locating a specific asset using navigation technology or specific signaling capabilities. This system improves a driver's productivity by providing location information or signals to a driver to assist him in locating a specific trailer. An embodiment includes a system for navigating/routing drivers to their assigned trailer, using GPS, and Navigation technology. Another embodiment includes an audio and/or visual signal from a specific trailer activated by a driver seeking the location of the specific trailer.

32 Claims, 4 Drawing Sheets

(56) References Cited

U.S. PATENT DOCUMENTS

| | | | |
|---|---|---|---|
| 6,927,688 B2* | 8/2005 | Tice | 340/539.26 |
| 7,167,920 B2* | 1/2007 | Traversat et al. | 709/230 |
| 7,242,279 B2* | 7/2007 | Wolfe | 340/5.9 |
| 7,339,469 B2* | 3/2008 | Braun | 340/539.13 |
| 7,493,211 B2* | 2/2009 | Breen | 701/32.3 |
| 7,612,668 B2* | 11/2009 | Harvey | 340/550 |
| 8,046,168 B2* | 10/2011 | Wang et al. | 701/469 |
| 8,058,987 B1* | 11/2011 | Battista | 340/539.13 |
| 8,064,841 B2 | 11/2011 | Doyle et al. | |
| 8,078,117 B2 | 12/2011 | Doyle et al. | |
| 8,600,601 B2* | 12/2013 | Kellar et al. | 701/23 |
| 2003/0233189 A1* | 12/2003 | Hsiao et al. | 701/207 |
| 2004/0082296 A1 | 4/2004 | Twitchell, Jr. | |
| 2005/0145688 A1 | 7/2005 | Milenkovic et al. | |
| 2005/0156716 A1 | 7/2005 | Flick | |
| 2005/0283613 A1 | 12/2005 | Carpentier et al. | |
| 2006/0176159 A1* | 8/2006 | Chu | 340/426.19 |
| 2006/0202817 A1* | 9/2006 | Mackenzie et al. | 340/539.13 |
| 2007/0288163 A1* | 12/2007 | Meyer et al. | 701/211 |
| 2008/0143593 A1* | 6/2008 | Graziano et al. | 342/357.09 |

OTHER PUBLICATIONS

Office Action dated May 27, 2010. U.S. Appl. No. 11/858,876.
Office Action dated Nov. 9, 2010. U.S. Appl. No. 11/858,876.

* cited by examiner

ROUTING DRIVERS TO TRAILERS EFFECTIVELY

BACKGROUND

1. Field

The present invention relates generally to asset location, and more specifically to a method and apparatus for automatically providing a geographic location of a specific asset.

2. Background

The present invention is designed to improve labor efficiency. The problem occurs when a tractor/truck driver enters a trailer yard, that may be extremely large and which stores potentially hundreds of trailers. When the driver is required to locate his/her assigned trailer, the driver is required to look for the trailer manually by slowly driving down each aisle to identify the assigned trailer. These manual searches of trailers are time-consuming and labor-intensive and can lead to driver error, such as a driver picking up the wrong trailer. The current approach has failed to leverage advances in technology.

SUMMARY

Embodiments disclosed herein address the above stated needs by providing a geographic location of a specific asset, such as a trailer, on demand. For example, a driver is assigned to deliver a specific trailer, and is instructed to find the trailer in a large lot containing a plurality of trailers. The present invention aids in locating the specific trailer. A trailer has been assigned to a driver, the trailer, equipped with global positioning system (GPS), reports its GPS location (latitude/longitude). This is passed electronically to the driver's navigation system. The navigation system interprets the trailer's GPS location and calculates the location of the trailer relative to the truck. The navigation system displays the trailer's location and calculates a route to the trailer.

In a second embodiment, a driver equipped with a communication device with a GPS navigation system, such as a cellular phone, personal digital assistant (PDA), or the like, receives routing instructions from a fleet station to locate a specific trailer which has a GPS system onboard. The routing instructions are sent via a wireless communications link.

In another embodiment, the driver is supplied with a wireless communication device, such as a cellular telephone with text messaging. The trailer is equipped with a tracking/communication system. A request for the trailer is sent to the system hosting the trailer tracking system. A message is sent to the trailer commanding it to make itself "apparent." The trailer responds in a predetermined manner, such as flashing lights, or the like. By using the disclosed embodiments, a driver can avoid wasting a considerable amount of time by pin pointing the location of the trailer without having to search the entire parking lot. In this way, the driver is routed to the trailer quickly and efficiently.

The object of the invention is to provide a capability to calculate the location of an assigned trailer and relate it to the location of the driver, display/route/guide drivers to their assigned trailer for purposes of increasing the driver's efficiency.

Another object of the present invention is to provide a method and apparatus for quickly and accurately providing location information to a driver of a trailer.

An advantage of the present invention is that it automatically calculates and displays the location of the assigned trailer relative to the driver's position and routes/guides drivers to their assigned trailer intelligently and graphically in order to improve the driver's efficiency.

Another advantage of the present invention is that it provides a driver a visual and/or audio identification of a specific trailer for locating the trailer.

DETAILED DESCRIPTION

The word "exemplary" is used herein to mean "serving as an example, instance, or illustration." Any embodiment described herein as "exemplary" is not necessarily to be construed as preferred or advantageous over other embodiments.

A truck driver's job responsibility is to transport trailers from one location to another. Once the trailer is dropped off, the truck driver is assigned a new job of transporting a different trailer to another location. Locating the assigned trailer can be difficult and time-consuming since some trailer yards are very large and may store hundreds of trailers.

Figure 1:
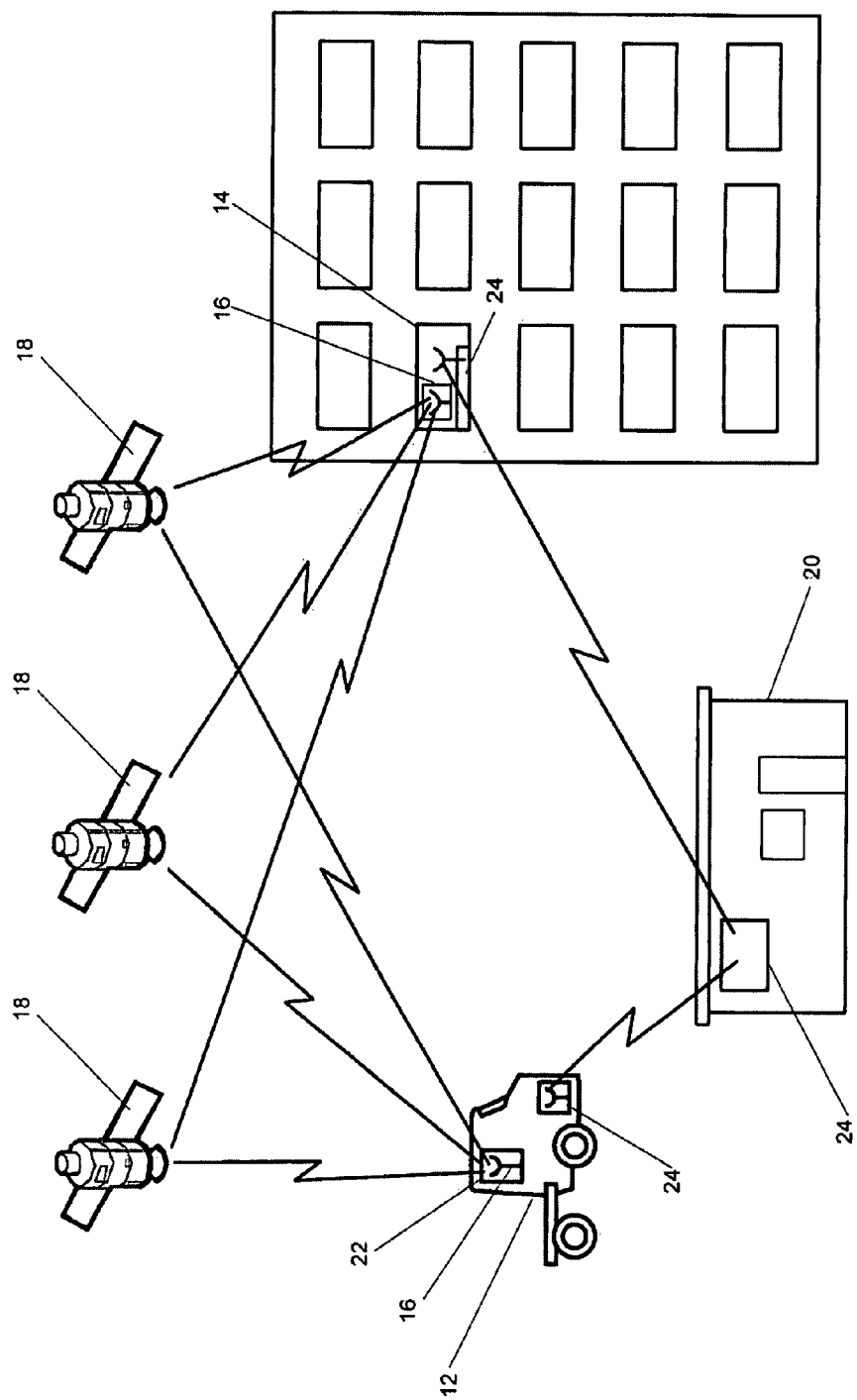
FIG. 1 depicts a system using a global positioning system and communication system to locate a trailer.

In an exemplary first embodiment as shown in FIG. 1, truck 12 and trailer 14 need to have GPS technology which include a GPS receiver 16 which communicates with satellites 18, a wireless communication system 24 to communicate between a remote fleet station 20, truck 12 and trailer 14. Additionally, truck 12 contains navigation technology, such as a navigation system 22. Wireless communication system 24 can be a satellite system, Wi-Fi system or a terrestrial system. Navigation system 22 can have a visual display and/or an audio instruction system.

Once trailer 14 has been assigned to a driver, trailer 14 reports its GPS location (latitude/longitude) via satellites 18 to fleet station 20 located remotely from the driver and trailer. Fleet station 20 passes the location information electronically to the driver's Navigation system 22. This can be done via a cellular system, a hand-held system such as a PDA, a laptop computer or other well known devices. Navigation system 22 then interprets the trailer's GPS location and calculates the location of trailer 14 relative to truck 12. Navigation system 22 can then display the trailer's location and calculate a route to trailer 14. In the alternative, fleet station 20 can obtain the GPS location of trailer 14 and truck, via communication system 24 and calculate the route for the driver to take to trailer 14. In this way, the driver is routed to the trailer quickly and efficiently.

In another embodiment, similar to the embodiment above, the driver is equipped with a communication device such as any type of mobile device, hand-held device, laptop computer, cellular phone or a personal data assistant (PDA) which contains a GPS navigation system 22. Trailer 14 is equipped with a GPS system which reports its location to fleet station 20. This location data is sent via wireless communication system 24 and sent to the drivers communication device. The calculation of the trailer's location (latitude/longitude) can be made at fleet station 20 and sent to the communication device or at the driver's communication device.

To avoid several trailers from reporting their positions continuously, fleet station 20 can remotely request trailer 14 to its position (latitude/longitude). Fleet station 20 can automatically append the trailer's reported location to a driver's work assignment or make it available for use by navigation system 22. The navigation system 22 makes use of the reported trailer location by displaying the trailer's location on a graphical map and/or guiding the driver to the trailer's location.

Figure 2:
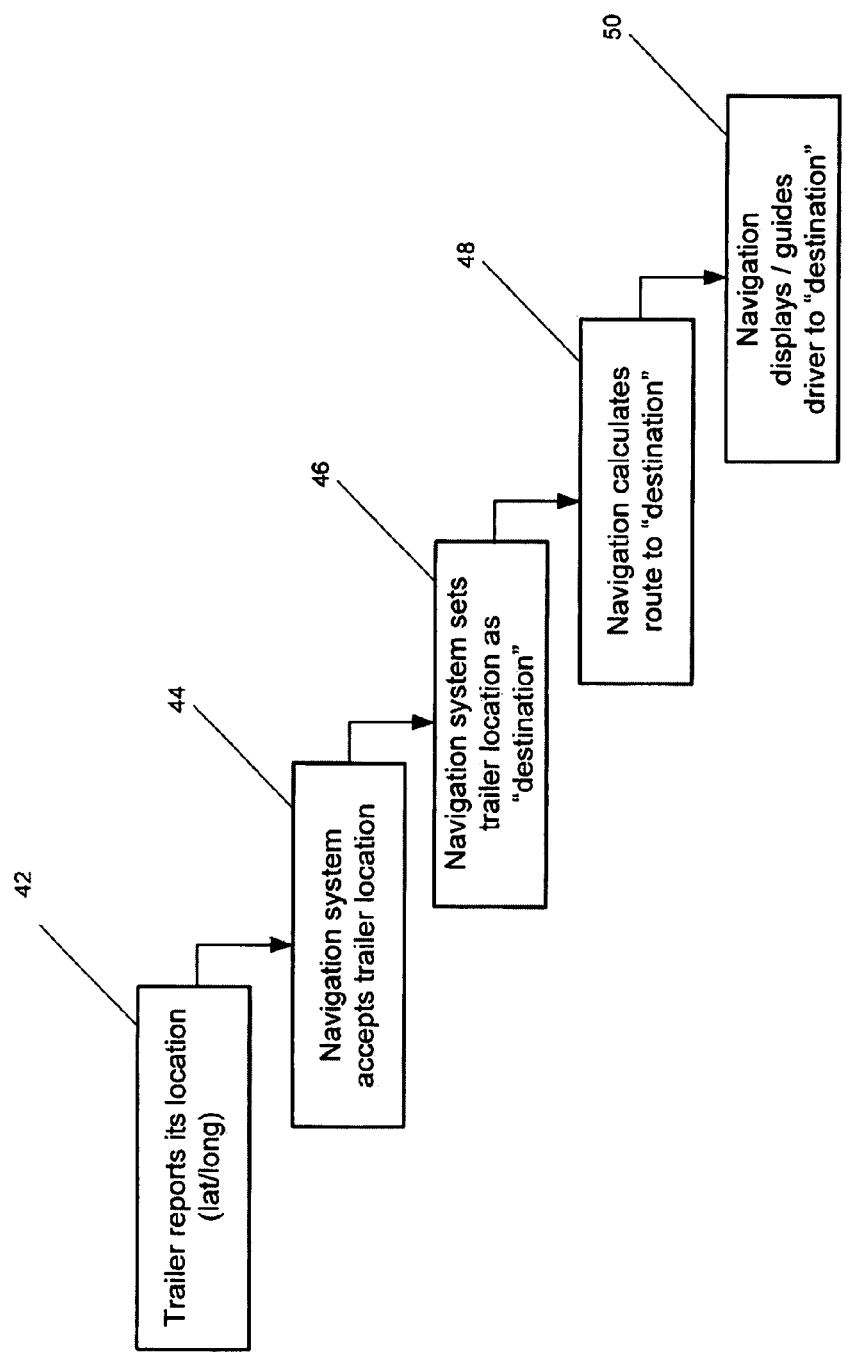
FIG. 2 is a flow chart showing the process of determining a trailer's location using the system of FIG. 1.

Software algorithms will determine the trailer's location relative to the driver and determine an appropriate method to guide the driver to the trailer. The process for determining the trailer's location is shown in the flow chart of FIG. 2. The first step of the process is to have the trailer report its location 42. Again, this is done via a wireless system. This step of reporting a location 42 can be on demand when queued, periodically or constantly. Navigation system accepts the location data 44 sets the trailer location as the destination 46. Using this information, the navigation system calculates a route from the truck's location to the trailer's location 48 using algorithms that are well known in the art. Finally, the calculated route is visually displayed or audio instructions are provided 50 to the driver guiding him/her to the trailer.

Figure 3:
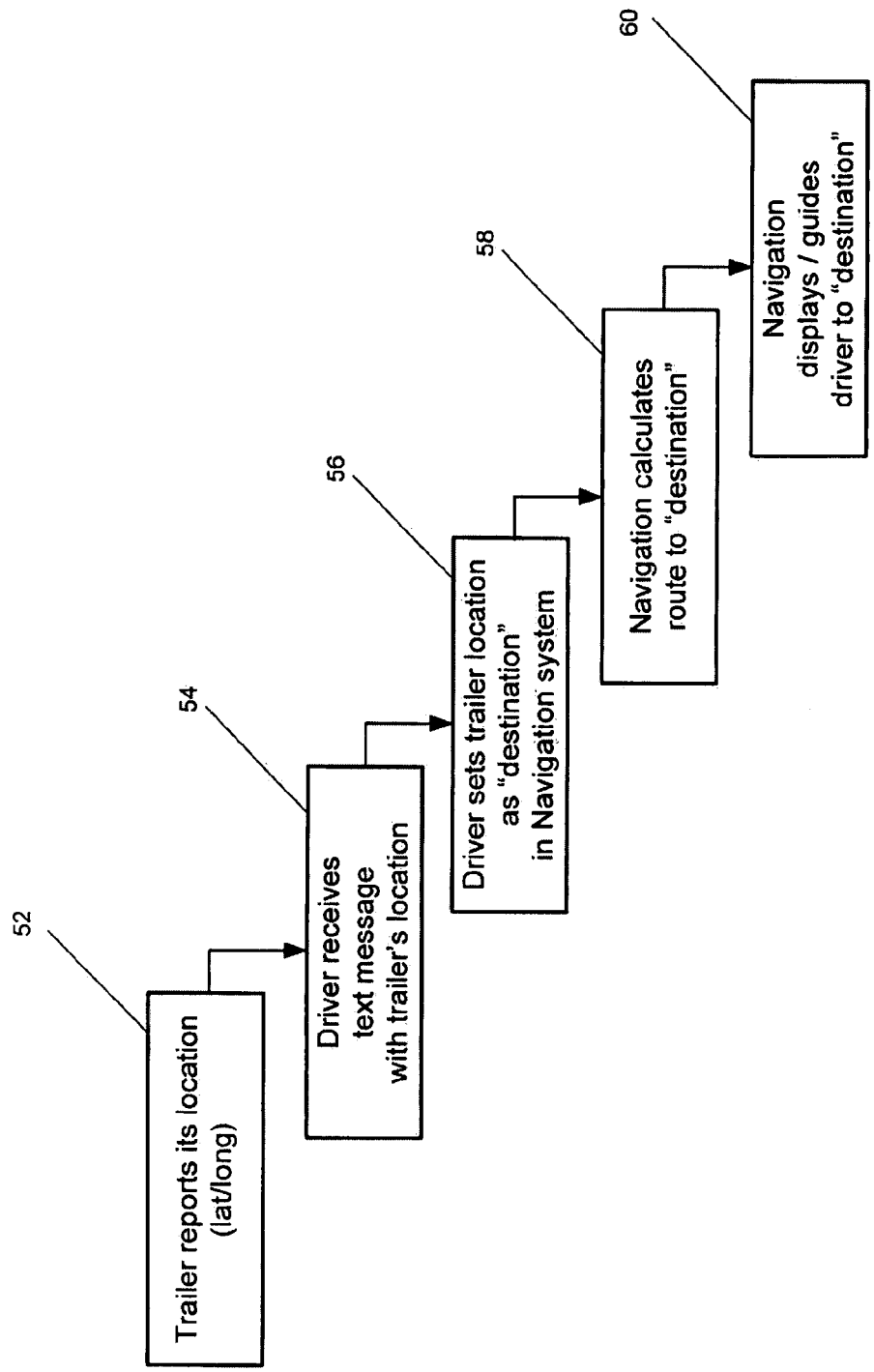
FIG. 3 is a flow chart showing the process of determining a trailer's location using a communication device.

In the embodiment where the driver is equipped with a communication device with a navigation system, the process is similar as shown in the flow chart of FIG. 3. In this process, the trailer reports its location 52 via a wireless communication system. This data can be sent to a remote location such as a fleet station and relayed to the driver or directly to the driver's communication system. This location data is received by the driver's communication system via a text message 54. The driver's communication system sets the trailer location as a destination in its navigation system 56. The navigation system then calculates a route to the trailer 58 using algorithms that are well known in the art. The navigation system then guides the driver to the trailer 60 either visually or by audio instructions.

Figure 4:
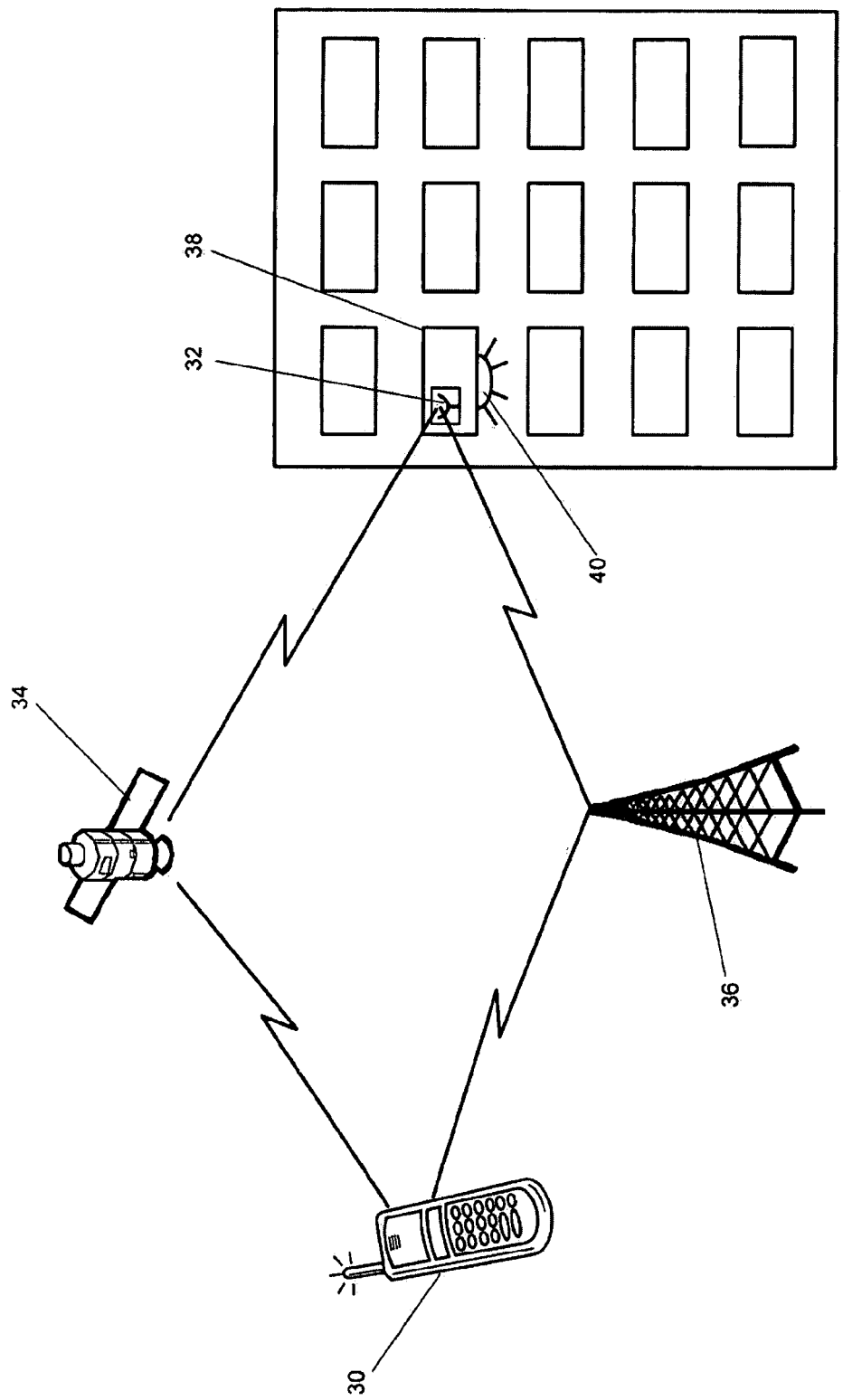
FIG. 4 depicts a wireless communication system to locate a trailer.

FIG. 4 shows another embodiment of a trailer locating system. In this embodiment, the driver is supplied with a wireless communication device 30, such as a cellular telephone with text messaging. Trailer 38 is equipped with a tracking/communication system 32. A request for the trailer is sent to the system hosting the trailer tracking system 32 from wireless communication device 30 via satellite system 34 or terrestrial system 36. A message is sent to trailer 38 commanding it to make itself "apparent". The trailer responds in a predetermined manner, such as flashing lights 40, or the like. By using the disclosed embodiments, a driver can avoid wasting a considerable amount of time by pin pointing the location of trailer 38 without having to search the entire parking lot.

The present invention will increase the driver's efficiency, which will help improve a fleet's operations, such as fuel costs, maintenance costs, and on-time appointments.

The methodologies described herein may be implemented by various means depending upon the application. For example, these methodologies may be implemented in hardware, firmware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a memory, such as a memory of a mobile device, and executed by a processor or microprocessor. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored.

Although GPS navigation system is referenced throughout, positioning capability is not limited to this particular methodology. A mobile device may receive signals from navigation system satellites from Galileo (to be implemented in the future), GLONASS, NAVSTAR, GNSS, a system that uses satellites from a combination of these systems, or any future satellite positioning system ("SPS"), for use in determining position location. As used herein, an SPS will also be understood to include pseudolite systems. Assisted GPS techniques are also commonly used to determine mobile device position. Further, satellite positioning systems may be used alone or in combination with terrestrial positioning systems and methodologies.

What is claimed is:

1. A system for routing a driver of a truck to a specific trailer located among a plurality of trailers, the system comprising:
 a driver's navigation system configured to calculate a route to the specific trailer based on location data received from a global positioning system (GPS) disposed on the specific trailer and navigate the truck to the location via the route; and
 a communication system configured to send a message to a signaling device on the specific trailer commanding the specific trailer to make itself apparent when the truck is within a radius of the location of the specific trailer, wherein the signaling device distinguishes the specific trailer from the plurality of trailers.

2. The system of claim 1 wherein the driver's navigation system comprises a GPS.

3. The system of claim 1 wherein the driver's navigation system comprises a display of the route.

4. The system of claim 1 wherein the driver's navigation system comprises audio directions of the route.

5. The system of claim 1 wherein the communication system comprises a
 member from the group consisting of a satellite system; a terrestrial system and a Wi-Fi system.

6. The system of claim 1 wherein the driver's navigation system
 comprises a member from the group consisting of a mobile device, a hand-held device, a cellular phone, a PDA and a laptop computer.

7. The system of claim 1, wherein the signaling device comprises a flashing light.

8. A method of routing a driver of a truck to a specific trailer located among a plurality of trailers, the method comprising:
 receiving, by a navigation system associated with the driver of the truck, a location of the specific trailer from a transmitter disposed in the specific trailer;
 calculating, by the navigation system, a route to the location of the specific trailer;
 navigating, by the navigation system, the truck to the location of the specific trailer via the calculated route; and
 sending, by a communications device associated with the driver of the truck, a message to a signaling device on the specific trailer commanding the specific trailer to make itself apparent when the truck is within a radius of the location of the specific trailer, wherein the signaling device distinguishes the specific trailer from the plurality of trailers.

9. The method of claim 8 wherein receiving the location comprises receiving the location via a wireless communication system.

10. The method of claim 8 wherein the location comprises a GPS location.

11. The method of claim 8 wherein navigating the truck comprises displaying the calculated route.

12. The method of claim 8 wherein navigating the truck comprises providing audio directions.

13. The method of claim 8, wherein the signaling device comprises a flashing light.

14. A system for locating a specific trailer located among a plurality of trailers by a driver of a truck, the system comprising;
a driver's transceiver configured to send communications via a wireless communication system to a trailer transceiver disposed in the specific trailer, wherein the driver of the truck is assigned a job for which the specific trailer is to be located; and
wherein the communications comprise a signal to activate a signaling device disposed on the specific trailer that makes the trailer apparent when the truck is within a radius of the location of the specific trailer, and wherein the signaling device distinguishes the specific trailer from the plurality of trailers.

15. The system of claim 14 wherein the wireless communication system comprises a member from the group consisting of a satellite system, a terrestrial system and a Wi-Pi system.

16. The system of claim 14 wherein the signaling device comprises a flashing light.

17. The system of claim 14 wherein the driver's transceiver comprises a member from the group consisting of a mobile device, a hand-held device, a cellular phone, a PDA and a laptop computer.

18. A machine-readable medium comprising instructions, which, when executed by a machine, cause the machine to perform operations, the instructions comprising:
program code to receive a location of a specific trailer located among a plurality of trailers from a transmitter disposed in the specific trailer;
program code to calculate a route to the location of the specific trailer;
program code to navigate the truck to the location of the specific trailer via the calculated route; and
program code to send a message to a signaling device on the specific trailer commanding the specific trailer to make itself apparent when the truck is within a radius of the location of the specific trailer and activate a signaling device on the specific trailer, wherein the signaling device distinguishes the specific trailer from the plurality of trailers.

19. An apparatus for providing to a driver of a truck a route to a specific trailer comprising:
means for receiving a location of the specific trailer from a transmitter disposed in the specific trailer;
means for calculating the route to the location of the specific trailer;
means for navigating the truck to the location of the specific trailer via the calculated route; and
means to send a message to a signaling device on the specific trailer commanding the specific trailer to make itself apparent when the truck is within a radius of the location of the specific trailer, wherein the signaling device distinguishes the specific trailer from a plurality of trailers.

20. The apparatus of claim 19 wherein the means for receiving the location comprises a GPS.

21. The apparatus of claim 19 wherein the means for navigating the truck comprises a display of the route.

22. The apparatus of claim 19 wherein the means for navigating the truck comprises audio directions of the route.

23. The apparatus of claim 19 wherein the means to calculate a route comprises a driver's navigation system.

24. The apparatus of claim 19 wherein the means for receiving the location comprises a member from the group consisting of a satellite system, a terrestrial system and a Wi-Fi system.

25. The apparatus of claim 19 wherein the means for receiving the location comprises a member from the group consisting of a mobile device, a hand-held device, a cellular phone, a PDA and a laptop computer.

26. The apparatus of claim 19, wherein the signaling device comprises a flashing light.

27. A method for locating a specific trailer located among a plurality of trailers by a driver of a truck, the method comprising;
sending, by a communications device associated with the driver of the truck, communications via a wireless communication system to a trailer transceiver disposed in the specific trailer, wherein the driver of the truck is assigned a job for which the specific trailer is to be located; and
wherein the communications comprise a signal to activate a signaling device disposed on the specific trailer that makes the trailer apparent when the truck is within a radius of the location of the specific trailer, and wherein the signaling device distinguishes the specific trailer from the plurality of trailers.

28. The method of claim 27, wherein the wireless communication system comprises a member from the group consisting of a satellite system, a terrestrial system and a Wi-Fi system.

29. The method of claim 27, wherein the signaling device comprises a flashing light.

30. The method of claim 27, wherein the communications device comprises a member from the group consisting of a mobile device, a hand-held device, a cellular phone, a PDA and a laptop computer.

31. A machine-readable medium comprising instructions, which, when executed by a machine, cause the machine to perform operations, the instructions comprising:
program code to send communications via a wireless communication system to a trailer transceiver disposed in the specific trailer, wherein the driver of the truck is assigned a job for which the specific trailer is to be located; and
wherein the communications comprise a signal to activate a signaling device disposed on the specific trailer that makes the trailer apparent when the truck is within a radius of the location of the specific trailer, and
wherein the signaling device distinguishes the specific trailer from a plurality of trailers.

32. An apparatus for locating a specific trailer located among a plurality of trailers by a driver of a truck, the apparatus comprising;
means for sending communications via a wireless communication system to a trailer transceiver disposed in the specific trailer, wherein the driver of the truck is assigned a job for which the specific trailer is to be located, wherein the communications comprise a signal to activate a signaling device disposed on the specific trailer that makes the trailer apparent when the truck is within a radius of the location of the specific trailer, and wherein the signaling device distinguishes the specific trailer from the plurality of trailers; and means for receiving a location of the specific trailer from the trailer transmitter disposed in the specific trailer.

\* \* \* \* \*